US008471701B2

(12) United States Patent
Yariv et al.

(10) Patent No.: US 8,471,701 B2
(45) Date of Patent: Jun. 25, 2013

(54) ASYMMETRIC DYNAMIC GEO-FENCING

(75) Inventors: Eran Yariv, Zichron Yaakov (IL);
Vadim Kuper, Yoqneam Ellit (IL);
Brian C. Beckman, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 137 days.

(21) Appl. No.: 13/118,495

(22) Filed: May 30, 2011

(65) Prior Publication Data

US 2012/0310527 A1 Dec. 6, 2012

(51) Int. Cl.
*G08B 1/08* (2006.01)

(52) U.S. Cl.
USPC ....... 340/539.13; 701/425; 701/426; 701/438

(58) Field of Classification Search
USPC ....... 701/200, 201, 426, 425, 438; 455/456.3, 455/457; 340/539.13, 540
See application file for complete search history.

(56) References Cited

U.S. PATENT DOCUMENTS

| | | | | |
|---|---|---|---|---|
| 6,665,613 | B2* | 12/2003 | Duvall | 701/485 |
| 6,721,652 | B1* | 4/2004 | Sanqunetti | 701/468 |
| 7,394,405 | B2* | 7/2008 | Godden | 340/996 |
| 7,577,522 | B2* | 8/2009 | Rosenberg | 701/433 |
| 7,848,765 | B2 | 12/2010 | Phillips et al. | |
| 2005/0159883 | A1* | 7/2005 | Humphries et al. | 701/207 |
| 2006/0200305 | A1* | 9/2006 | Sheha et al. | 701/200 |
| 2006/0224319 | A1* | 10/2006 | Rogers | 701/213 |
| 2006/0270421 | A1* | 11/2006 | Phillips et al. | 455/457 |
| 2007/0123220 | A1* | 5/2007 | Weiser et al. | 455/412.1 |
| 2007/0176771 | A1* | 8/2007 | Doyle | 340/539.13 |
| 2008/0014908 | A1* | 1/2008 | Vasant | 455/414.1 |
| 2008/0021637 | A1* | 1/2008 | Staton et al. | 701/207 |
| 2008/0125965 | A1 | 5/2008 | Carani et al. | |
| 2009/0017811 | A1* | 1/2009 | Cole et al. | 455/418 |
| 2010/0222081 | A1* | 9/2010 | Ward et al. | 455/456.3 |
| 2010/0253508 | A1 | 10/2010 | Koen et al. | |

(Continued)

OTHER PUBLICATIONS

Bareth, et al., "geoXmart—A Marketplace for Geofence-Based Mobile Services", Retrieved at <<http://ieeexplore.ieee.org/stamp/stamp.jsp?tp=&arnumber=5676340>>, Proceedings of the 34th Annual IEEE International Computer Software and Applications Conference, Jul. 19-23, 2010.

(Continued)

*Primary Examiner* — Khoi Tran
*Assistant Examiner* — Rachid Bendidi
(74) *Attorney, Agent, or Firm* — The Law Office of Michael E. Kondoudis

(57) ABSTRACT

Architecture that enables location based notifications (e.g., geo-fences) using standard polygons the capture of complex regions. As applied to geo-fencing, it extends geo-fencing beyond the mere representation of the virtual perimeter (fenced) area. More specifically, the architecture takes into consideration geographical and demographical features, such as the layout of the roads and streets, the types of available of transportation (e.g., car, bus, walk, biking, etc.), the traffic conditions, and the dynamic properties of a point of interest (POI) such as opening hours, total wait time, etc. More specifically, the architecture enables the dynamic modification of polygon geo-fence based on POI properties, dynamic modification of polygon geo-fence based on road/street layout, dynamic modification of polygon geo-fence based on means of transportation, dynamic modification of polygon geofence based on traffic conditions, dynamic modification of polygon geo-fence based on user's state, and dynamic recalculation of regions and directions tailored to user interests.

20 Claims, 6 Drawing Sheets

U.S. PATENT DOCUMENTS

2010/0291950 A1 11/2010 Lin et al.
2010/0295676 A1 11/2010 Khachaturov et al.
2011/0001638 A1* 1/2011 Pudar .......................... 340/988

OTHER PUBLICATIONS

Demiryurek, et al., "TransDec:A Spatiotemporal Query Processing Framework for Transportation Systems", Retrieved at <<http://ieeexplore.ieee.org/stamp/stamp.jsp?tp=&arnumber=5447745>>, IEEE 26th International Conference on Data Engineering (ICDE), Mar. 1-6, 2010.

Resch, et al., "Live Geography—Embedded Sensing for Standardised Urban Environmental Monitoring", Retrieved at <<http://senseable.mit.edu/papers/pdf/2009_Resch_et_al_ASM_urban_environmental_monitoring.pdf>>, International Journal on Advances in Systems and Measurements, Dec. 1, 2009.

* cited by examiner

US 8,471,701 B2

ASYMMETRIC DYNAMIC GEO-FENCING

BACKGROUND

Existing geo-fencing solutions use either a point and, a radius or a rectangular grid on a map to designate an area of interest. More advanced geo-fencing solutions use a polygon to define the area. However, these solutions always use fixed geographic boundaries and do not take into consideration the time it takes to reach the point of interest, and multiple other factors that affect the user's want such as traffic condition, the ability to react to geo-notifications, and so on.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables location based notifications (e.g., geo-fences) using standard polygons, which enable the capture of complex regions. The disclosed architecture as applied to geo-fencing extends geo-fencing beyond the mere representation of the virtual perimeter (fenced) area. More specifically, the architecture takes into consideration geographical and demographical features, such as the layout of the roads and streets, the types of available of transportation (e.g., car, bus, walk, biking, etc.), the traffic conditions, and the dynamic properties of a point of interest (POI) such as opening hours, total wait time, etc.

More specifically, the architecture enables the dynamic modification of polygon geo-fence based on POI properties, dynamic modification of polygon geo-fence based on road/street layout, dynamic modification of polygon geo-fence based on means of transportation, dynamic modification of polygon geo-fence based on traffic conditions, dynamic modification of polygon geo-fence based on user's state, and dynamic recalculation of regions and directions tailored to user interests.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
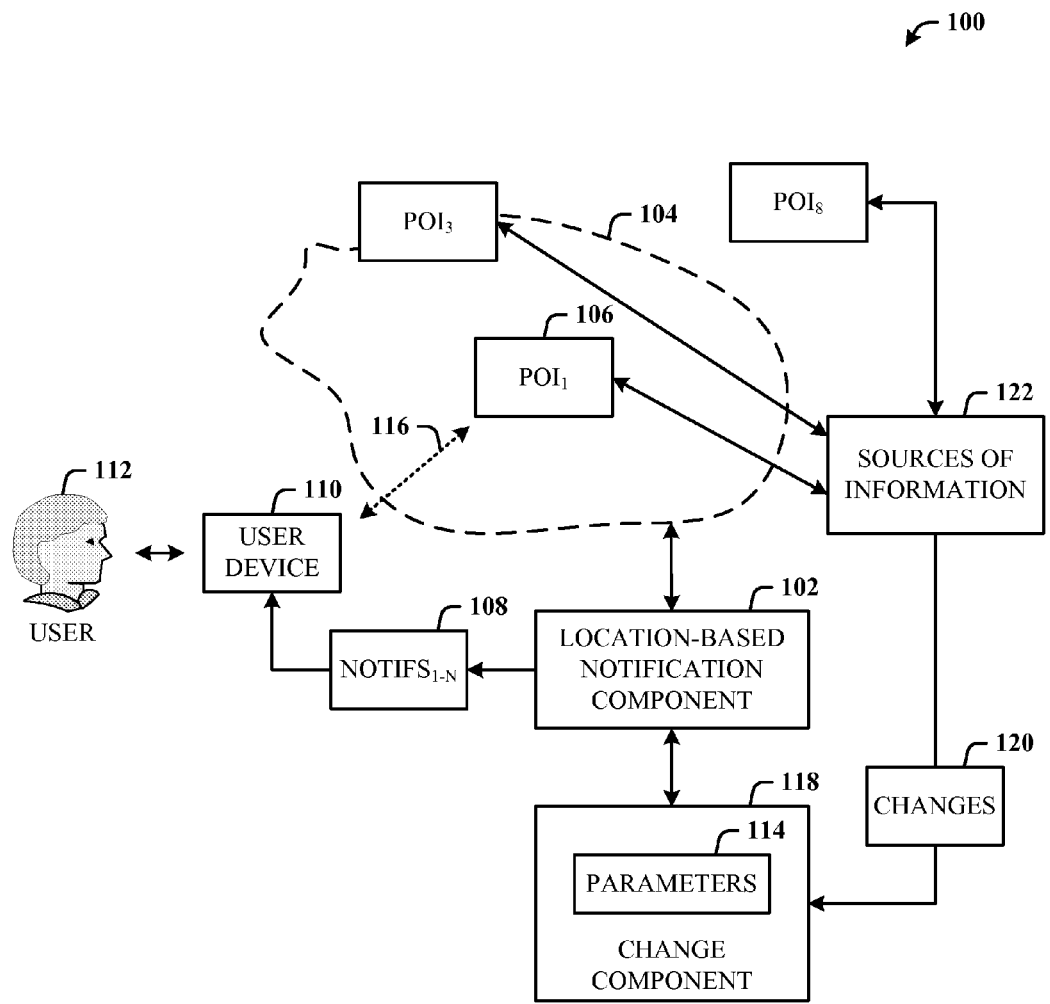
FIG. 1 illustrates a notification system in accordance with the disclosed architecture.

The disclosed architecture provides a location-based notification services (e.g., geo-fence) to users, which uses standard polygons that enable the capture of complex geographical regions. The architecture is based on existing polygon-based geo-fencing and optimization solutions, but extends these solutions to be dynamic and asymmetric. The geo-fence is constructed in a semi-automatic method and is changed dynamically as properties of the user, a point of interest (POI), and/or the environment, change.

The user device is tracked using location-based services such as global positioning system (GPS), triangulation, wireless access points, address, or other known techniques for identifying the geographical location of a device. The geofence is a virtual perimeter defined relative to a landmark (e.g., business) or site (e.g., a park, highway, etc.). A specific landmark can be designated a POI by the user and the geo-fence then operates on this POI. In a traditional radius-based geo-fence, the POI is the center of a circle of a defined radius. When the user device intersects the virtual perimeter, a notification is generated and sent to the user device. In the background, the geographical locations of the POI and many different POIs are known and stored in a datastore that is then used to compare the changing geolocation of the user device. When the user device come within the radius distance to the POI, the geo-fence is triggered and a notification sent.

The architecture considers the layout of the roads and streets, the modes of transportation (e.g., car, bus, walking, running, biking, etc.), the traffic conditions, and the properties of the POI such as opening hours, total wait time, etc.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a notification system 100 in accordance with the disclosed architecture. The system 100 includes a location-based notification component 102 that generates a polygon-based virtual perimeter 104 (e.g., geo-fence) in association with a geographical point of interest 106 (e.g., business, scenic site, park, hiking path, etc.) and enables communication of notifications 108 (denoted NOTIFS$_{1-N}$) to a user device 110 of a user 112 based on parameters 114 related to user interaction 116 with the point of interest 106.

The parameters 114 include all the aspects of the POI and environment that enable the user to interact with the POI 106. For example, the parameters 114 include road conditions, weather conditions, available routes to the POI, commuter conditions, general traffic conditions, product and/or service availability of the POI, sales promotions at the POI, schedule availability of the user, mode of transportation when heading to the POI, speed of movement toward or in the general direction of the POI, and so on.

A change component 118 dynamically initiates modification of the virtual perimeter 104 by the location-based notification component 102 in response to changes 120 to the parameters 114. These changes 120 can be associated with parameters 114 that include, but are not limited to, hours of operation of a business or site, in-force or expired sales, change in location for temporary points of interest (e.g., police checkpoints, roadside vegetable stands, etc.), just to name a few. The sources of information 122 about the changes 120 and/or from which changes 120 can be computed or derived can be obtained from websites or other network-based sources, user-based sources such as a user profile, scheduling program of a user computing device (e.g., smart phone, portable or desktop computer), social networking website to which the user subscribes, etc.

In accordance with the disclosed architecture and which is described in greater detail herein, the virtual perimeter can dynamically modified based on changes to parameters related to at least one of a user of the user device, the point of interest, and/or geographical environment (e.g., weather conditions, road conditions, construction conditions, traffic conditions, etc.). The virtual perimeter can be dynamically modified based on changes to properties of the point of interest. The virtual perimeter can be dynamically modified based on parameters related to a route to the point of interest. The virtual perimeter can be dynamically modified based on parameters related to mode of transportation to the point of interest.

The virtual perimeter can be dynamically modified based on parameters related to traffic conditions to the point of interest. The virtual perimeter can be dynamically modified based on parameters related to state of a user of the user device. The virtual perimeter can be dynamically modified based on parameters related to geographical regions and directions customized to a user of the user device in consideration of interests of the user.

More specifically, the polygon geo-fence can be dynamically modified based on properties of the POI. Since a POI in the geo-fence can be related to a real entity (e.g., a business, a home, etc.), the geo-fence can be tailored based on the properties of the entity. For example, if a user sets a geo-reminder on a business with the intent of buying a product there, the notification (a reminder) can be dynamically toggled on/off based on the operating hours (e.g., opening hours) of the business.

Another example detects that if the business is a restaurant and the restaurant is busy, the range of the geo-fence can be extended (expanded) to detect when the user is heading towards that restaurant and then notifying the user to book reservations well in advance (e.g., hours before arriving at a destination).

The architecture can perform dynamic modification of a polygon geo-fence based on road/street layout. Taking into consideration the layout of the streets and roads can help generate a more accurate geo-reminder polygon; for example, if a user is setting a geo-reminder on a business in a mall with the intent of buying a product there. Driving on a freeway that is near the mall and getting within less than half a mile from the store (the center of the POI) is not helpful if the user is driving in the wrong direction and there is no nearby exit to that mall. Similarly, if the user drove by the mall exit, which was two miles ago, and the nearest U-turn point is seven miles away, is not useful. In short, the disclosed geo-fence polygon captures the area that represents a constant time in the circumference rather than constant distance.

The architecture can perform dynamic modification of a polygon geo-fence based on means (mode) of transportation. This is a natural extension of the previous capability related to road and street layout. If the user is driving a car, the road vectors and layout (e.g., junctions, road directions, exits, etc.) are considered. If the user is riding a bus, the bus' fixed route can be considered (e.g., with bus stops). If the user is walking, the street and pathway layouts (e.g., to cross the highway, the pedestrian bridge half a mile East of the junction should be used) can be considered. The mode of transportation can be deduced and the right geo-fence polygon dynamically created based on the route and speed at which the user is moving.

The architecture can perform dynamic modification of a polygon geo-fence based on traffic conditions. Another natural extension is using traffic data to create the right geo-fence. This transforms the geo-fence from a distance-based reminder (as classic radius-based solutions) to a time-based reminder. For example, a reminder such as "notify me when I'm ten minutes from the mall" will fire six miles away on a traffic-free highway, and only one mile away from the exit when the user is slowly moving in or through traffic.

The architecture can perform dynamic modification of a polygon geo-fence based on user state. This enables dynamically changing the geo-fencing attributes based on the user's recent activities and current state of mind. For example, this enables the creation of more complex geo-fencing reminders such as "tell me when I'm ten minutes away from the mall and have two hours to spend shopping" takes into consideration the user's current free/busy schedule.

The architecture can perform dynamic recalculation of regions and directions of interest to the user within a polygon. Given knowledge of attributes of various regions (e.g., over here is a shopping mall, over there is a park with hiking trails, this way is a theater), regions and directions tailored to user preferences can be quickly calculated.

User A may have expressed an interest in shopping. Thus, to indicate this as presented to a user, the map can be shaded in the direction of the mall, or indicia such as an arrow (if requested) can be shown as pointing toward the mall. User B may have expressed in interest in hiking In the same or similar polygon, the map can be shaded correspondingly or an arrow provided that points toward the park for this user.

These capabilities are enabled by the polygonal nature of the disclosed architecture. The complex hull of a polygon is simplex (a simple polygon). There are efficient methods for maximizing merit functions (or minimizing cost functions) over simplex polygons. The user preferences are expressed as a function of position that multiplies the attributes of an area by user-specific coefficients representing the user interest level in each attribute, and then the function is quickly maximized over the simplex. Standard maximization techniques can also provide the direction (or gradient) in which the merit function increases most rapidly, thereby enabling shading or arrows, for example.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2:
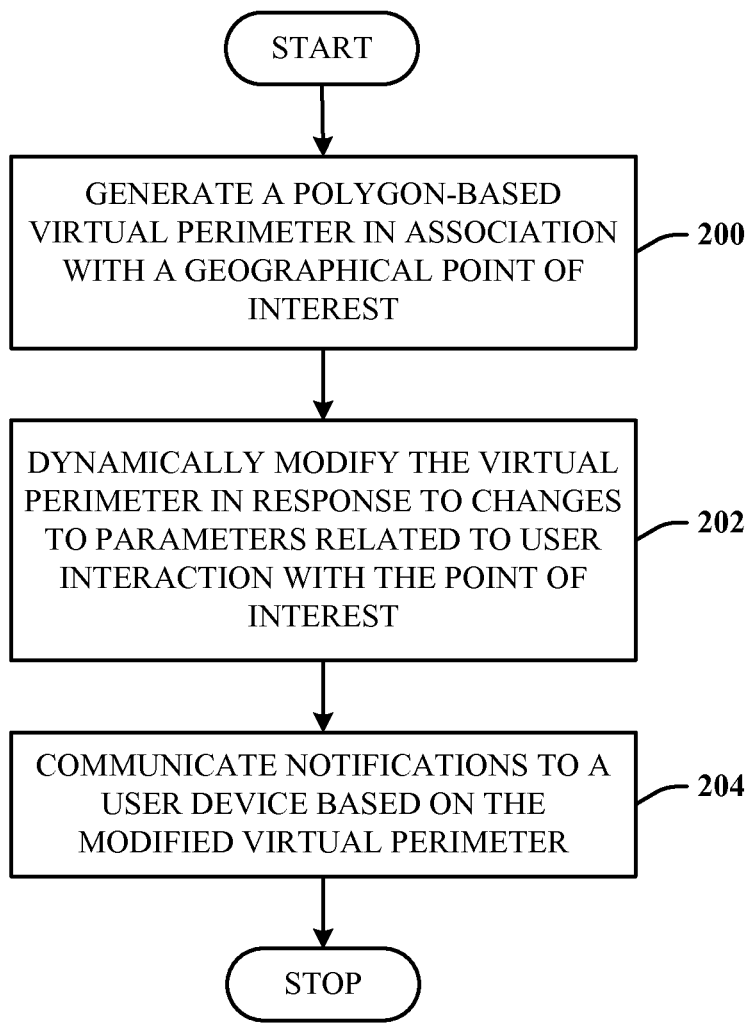
FIG. 2 illustrates a computer-implemented notification method in accordance with the disclosed architecture.

FIG. 2 illustrates a computer-implemented notification method in accordance with the disclosed architecture. At 200, a polygon-based geo-fence is generated in association with geographical points of interest and parameters (e.g., times of operation, distance, routes of ingress and egress, mode of transportation, etc.) associated with the points of interest. The parameters are considered for user interaction (e.g., travel to and from) with the points of interest. At 202, a change in a parameter of a point of interest is detected. At 204, the geo-fence is dynamically modified in response to the detected change. At 206, a notification associated with the detected change is communicated to a user device.

Figure 3:
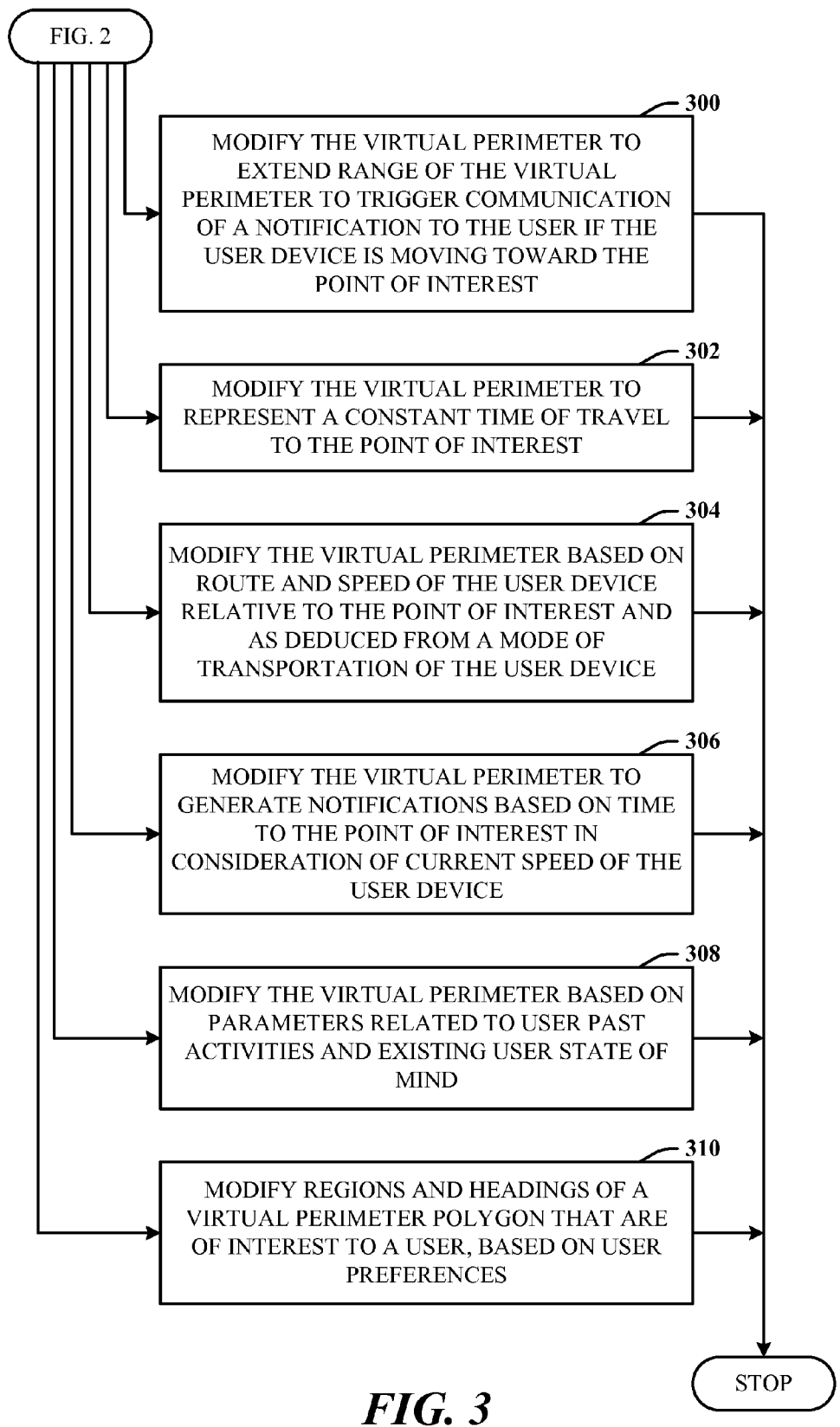
FIG. 3 illustrates further aspects of the method of FIG. 2.

FIG. 3 illustrates further aspects of the method of FIG. 2. Note that the flow indicates that each block can represent a step that can be included, separately or in combination with other blocks, as additional aspects of the method represented by the flow chart of FIG. 2. At 300, the virtual perimeter is modified to extend range of the virtual perimeter to trigger communication of a notification to the user if the user device is moving toward the point of interest. At 302, the virtual perimeter is modified to represent a constant time of travel to the point of interest. At 304, the virtual perimeter is modified based on route and speed of the user device relative to the point of interest and as deduced from a mode of transportation of the user device. At 306, the virtual perimeter is modified to generate notifications based on time to the point of interest in consideration of current speed of the user device. At 308, the virtual perimeter is modified based on parameters related to user past activities and existing user state of mind. At 310, regions and headings of a virtual perimeter polygon that are of interest to a user, are modified, based on user preferences.

Figure 4:
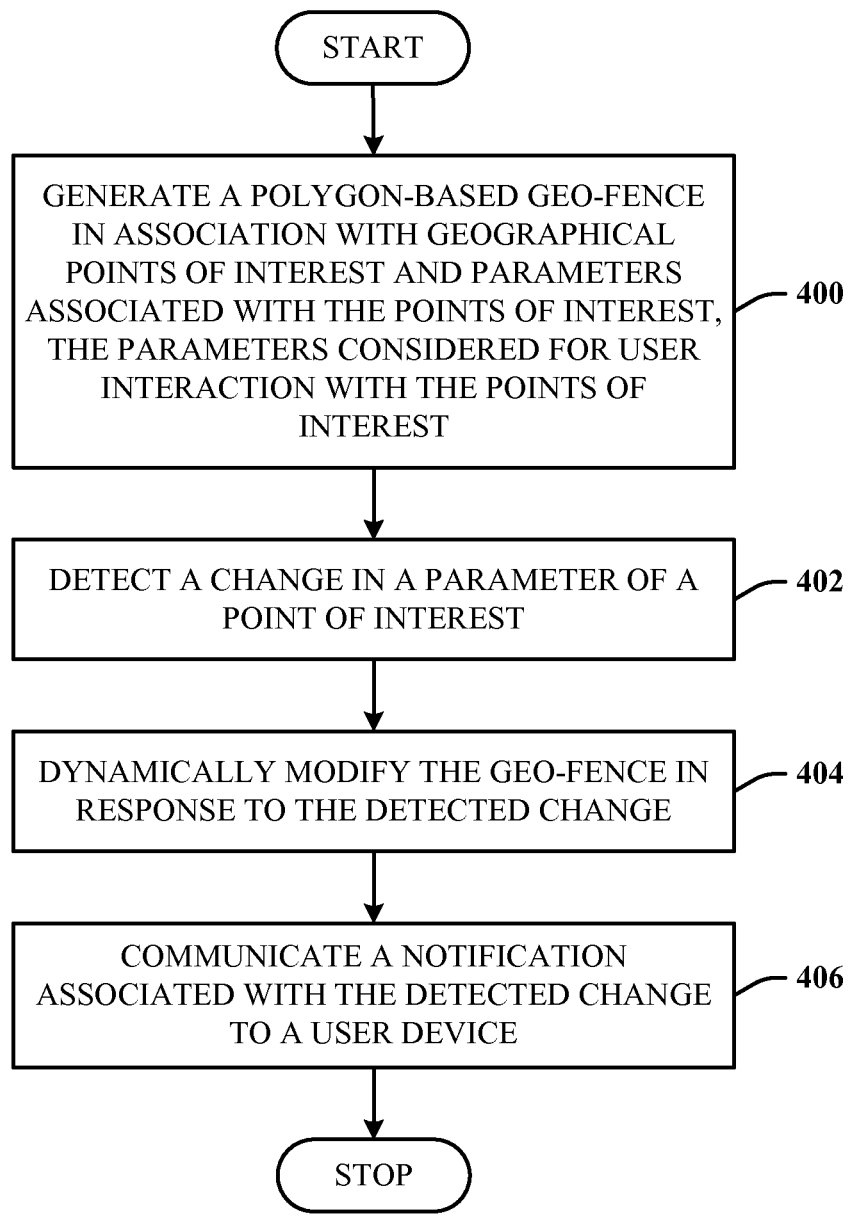
FIG. 4 illustrates an alternative notification method.

FIG. 4 illustrates an alternative notification method. At 400, a polygon-based geo-fence is generated in association with geographical points of interest and parameters associated with the points of interest. The parameters are considered for user interaction with the points of interest. At 402, a change in a parameter (e.g., time of opening, time of closing, desired product is now off sale, business has closed, etc.) of a point of interest is detected. At 404, the geo-fence is dynamically modified in response to the detected change. At 406, a notification associated with the detected change is communicated to a user device (for presentation to the user based on the detected change).

Figure 5:
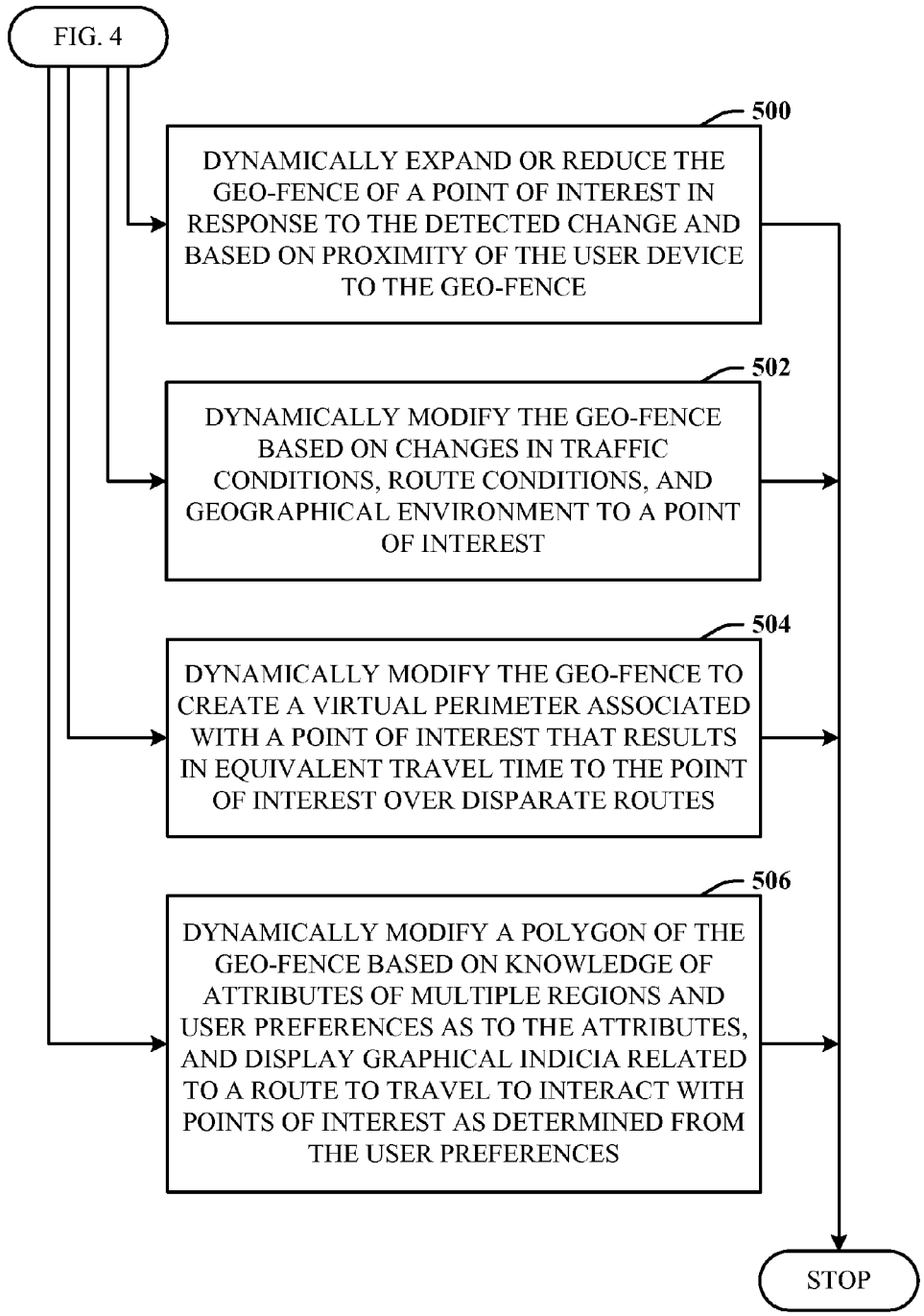
FIG. 5 illustrates further aspects of the method of FIG. 4.

FIG. 5 illustrates further aspects of the method of FIG. 4. Note that the flow indicates that each block can represent a step that can be included, separately or in combination with other blocks, as additional aspects of the method represented by the flow chart of FIG. 4. At 500, the geo-fence of a point of interest is dynamically expanded or reduced in response to the detected change and based on proximity of the user device to the geo-fence. At 502, the geo-fence is dynamically modified based on changes in traffic conditions, route conditions, and geographical environment to a point of interest. At 504, the geo-fence is dynamically modified to create a virtual perimeter associated with a point of interest that results in equivalent travel time to the point of interest over disparate routes. At 506, a polygon of the geo-fence is dynamically modified based on knowledge of attributes of multiple regions and user preferences as to the attributes, and displaying graphical indicia related to a route to travel to interact with points of interest as determined from the user preferences.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
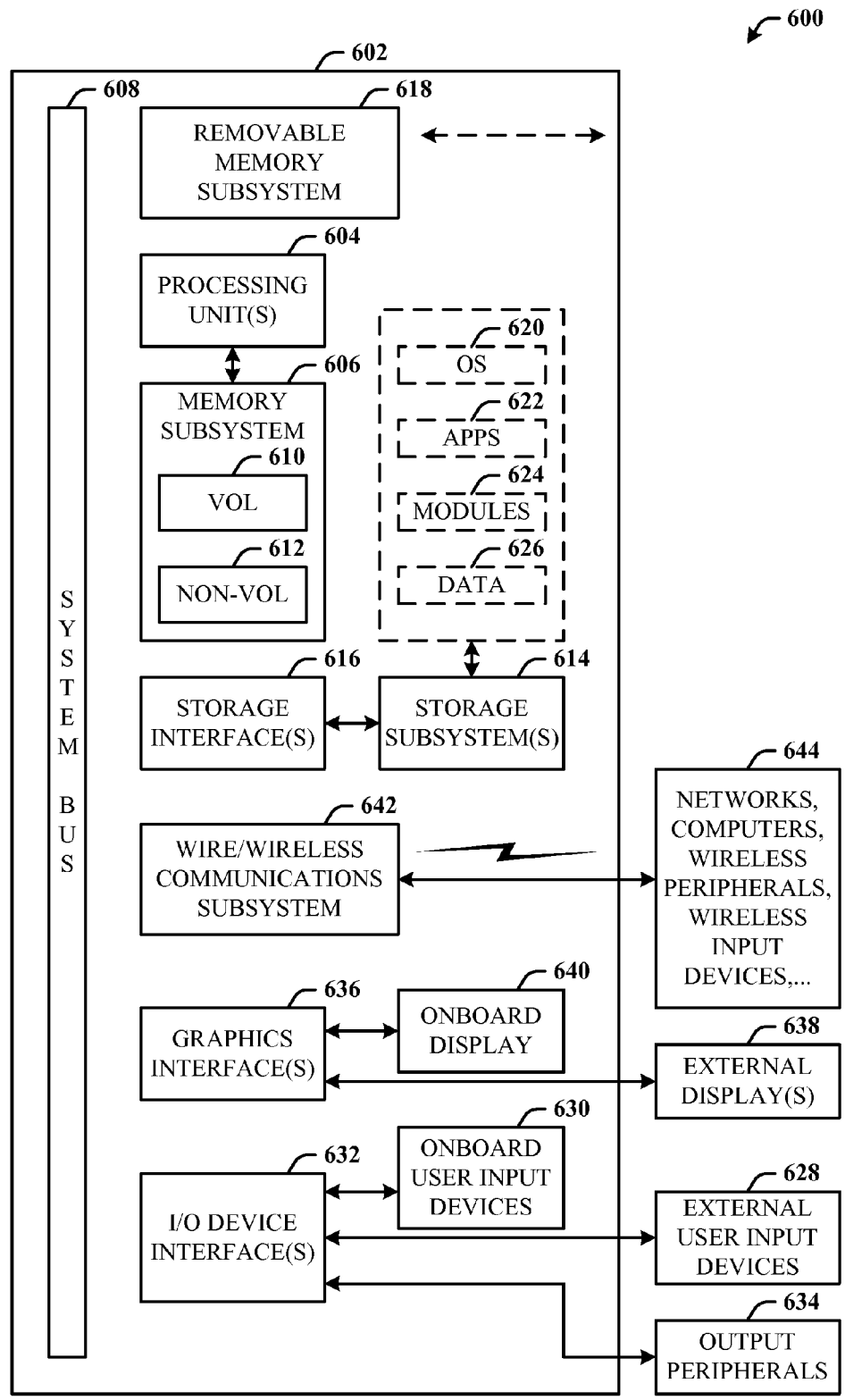
FIG. 6 illustrates a block diagram of a computing system that executes asymmetric dynamic geo-fencing in accordance with the disclosed architecture.

Referring now to FIG. 6, there is illustrated a block diagram of a computing system 600 that executes asymmetric dynamic geo-fencing in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a computer-readable storage such as a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include computer-readable storage (physical storage media) such as a volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components. The storage subsystem(s) 614 (physical storage media) can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The operating system 620, one or more application programs 622, other program modules 624, and/or program data 626 can include the entities and components of the system 100 of FIG. 1, and the methods represented by the flowcharts of FIGS. 2-5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 602 and includes volatile and non-volatile internal and/or external media that is removable or non-removable. For the computer 602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented notification system, comprising:
 a location-based notification component that generates a polygon-based virtual perimeter in association with a geographical point of interest and enables communication of notifications to a user device based on parameters related to user interaction with the point of interest;
 a change component that dynamically initiates modification of the virtual perimeter by the location-based notification component in response to changes to the parameters; and
 a processor that executes computer-executable instructions associated with at least one of the location-based notification component or the change component.

2. The system of claim 1, wherein the virtual perimeter is modified based on changes to parameters related to at least one of a user of the user device, the point of interest, or geographical environment.

3. The system of claim 1, wherein the virtual perimeter is modified based on changes to properties of the point of interest.

4. The system of claim 1, wherein the virtual perimeter is modified based on parameters related to a route to the point of interest.

5. The system of claim 1, wherein the virtual perimeter is modified based on parameters related to mode of transportation to the point of interest.

6. The system of claim 1, wherein the virtual perimeter is modified based on parameters related to traffic conditions to the point of interest.

7. The system of claim 1, wherein the virtual perimeter is modified based on parameters related to a state of a user of the user device.

8. The system of claim 1, wherein the virtual perimeter is modified based on parameters related to geographical regions and directions customized to a user of the user device in consideration of interests of the user.

9. A computer-implemented notification method, comprising acts of:
 generating a polygon-based virtual perimeter in association with a geographical point of interest;
 dynamically modifying the virtual perimeter in response to changes to parameters related to user interaction with the point of interest;
 communicating notifications to a user device based on the modified virtual perimeter; and
 utilizing a processor that executes instructions stored in memory to perform at least one of the acts of generating, communicating, or modifying.

10. The method of claim 9, further comprising modifying the virtual perimeter to extend range of the virtual perimeter to trigger communication of a notification to the user if the user device is moving toward the point of interest.

11. The method of claim 9, further comprising modifying the virtual perimeter to represent a constant time of travel to the point of interest.

12. The method of claim 9, further comprising modifying the virtual perimeter based on route and speed of the user device relative to the point of interest and as deduced from a mode of transportation of the user device.

13. The method of claim 9, further comprising modifying the virtual perimeter to generate notifications based on time to the point of interest in consideration of current speed of the user device.

14. The method of claim 9, further comprising modifying the virtual perimeter based on parameters related to user past activities and existing user state of mind.

15. The method of claim 9, further comprising modifying regions and headings of a virtual perimeter polygon that are of interest to a user, based on user preferences.

16. A computer-implemented notification method, comprising acts of:
 generating a polygon-based geo-fence in association with geographical points of interest and parameters associated with the points of interest, the parameters considered for user interaction with the points of interest;
 detecting a change in a parameter of a point of interest;
 dynamically modifying the geo-fence in response to the detected change;
 communicating a notification associated with the detected change to a user device; and
 utilizing a processor that executes instructions stored in memory to perform at least one of the acts of generating, detecting, communicating, or modifying.

17. The method of claim 16, further comprising dynamically expanding or reducing the geo-fence of a point of interest in response to the detected change and based on proximity of the user device to the geo-fence.

18. The method of claim 16, further comprising dynamically modifying the geo-fence based on changes in traffic conditions, route conditions, and geographical environment to a point of interest.

19. The method of claim 16, further comprising dynamically modifying the geo-fence to create a virtual perimeter associated with a point of interest that results in equivalent travel time to the point of interest over disparate routes.

20. The method of claim 16, further comprising dynamically modifying a polygon of the geo-fence based on knowledge of attributes of multiple regions and user preferences as to the attributes, and displaying graphical indicia related to a route to travel to interact with points of interest as determined from the user preferences.

* * * * *